2,944,058

PROCESS FOR PREPARING SUBSTITUTED CARBAZOLE DERIVATIVES

Rolf Kallischnigg, Hamburg, Germany, assignor to Chemische Fabrik Promonta G.m.b.H., Hamburg, Germany, a firm of Germany No Drawing. Filed June 25, 1957, Ser. No. 667,957

Claims priority, application Germany June 27, 1956

9 Claims. (Cl. 260—293.2)

This invention relates to the preparation of carbazoles substituted at the nitrogen by derivatives of N-alkylpiperidine and it has particular relation to a novel process for preparing such carbazoles. These compounds correspond to the general formula

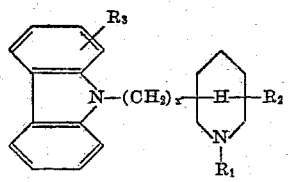

wherein the carbazole is attached either directly in the 3- or 4-position of the piperidine radical ($x$ being 0), or in the 2-, 3- or 4-position of the piperidine radical over a hydrocarbon chain consisting of one or two methylene groups ($x$ being 1 or 2); $R_1$ is a lower alkyl radical, preferably methyl radical; $R_2$ stands for hydrogen or a lower alkyl radical; and $R_3$ stands for H, lower alkyl, oxy or alkoxy groups or halogen.

It has been found that compounds corresponding to the above general formula can be prepared with advantage by the following steps:

(1) Carbazole, or a C-substituted carbazole, is alkylated with a pyridyl halide or pyridyl alkyl halide, preferably chloride or bromide, in form of the bases or salts, in the presence of alkaline condensing agents, such as alkali-metals, or their hydrides, amides, oxides or carbonates, in an inert solvent, e.g. aromatic hydrocarbons, or higher ethers;

(2) The resulting pyridyl carbazoles or pyridylalkyl carbazoles are quaternarized at the pyridine nitrogen with lower alkyl halides, and (3) The pyridinium salts thus prepared, are subjected to hydrogenation in the presence of conventional noble metal catalysts, or other (i.e. non-noble) metallic catalysts, in order to convert them into the corresponding N-alkylpiperidyl carbazoles or N-alkylpiperidyl alkylcarbazoles. The resulting pyridinium salts correspond to the general formula

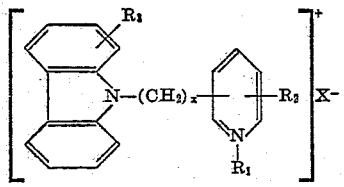

wherein $R_1$, $R_2$ and $R_3$ have the meaning defined above, and X denotes the anion, e.g. chlorine or bromine.

It has been found that the novel process can be carried out with very good yields even in those cases, in which condensation with the piperidine derivatives is connected with considerable difficulties in view of their steric hindrance.

The following specification describes by way of example some specific embodiments of and best modes for carrying out the invention, to which the invention is not limited.

EXAMPLE 1

*1-alkyl piperidyl-3-methyl-carbazole*

ALKYLATION

*Pyridyl-3-methyl carbazole.*—In a 2-liter three-necked flask provided with stirrer, reflux condenser and dropping funnel 102 grams of carbazole, 35 grams of sodium amide and 600 cm.$^3$ of dry xylene are introduced. The mixture is heated to boiling under stirring and under reflux, until the greatest part of the carbazole is converted into the sodium compound.

Subsequently 78 grams of pyridyl-3-methyl chloride in 500 cm.$^3$ of xylene—freshly set free from 102 grams of pyridyl-3-methyl chloride hydrochloride—are dropwise added during one hour. Boiling is continued for an additional hour, the reaction product is decomposed with some alcohol and subsequently water, the xylene solution is abundantly washed with water and the base is extracted therefrom by means of dilute hydrochloric acid. The aqueous acid solution—from which a considerable portion of the hydrochloride separates in crystalline form—is rendered alkaline with ammonia and the separated base is taken up in chloroform. After drying with potassium carbonate and purification with active carbon, the chloroform is distilled off and the crystalline residue is recrystallized from acetic ester. 135 grams of pyridyl-3-methyl carbazole having a melting point of 117° C. are thus obtained.

QUATERNARIZATION (a) *Pyridyl-3-methyl-carbazole-metho bromide.* — 50 grams of pyridyl-3-methyl carbazole are heated with 22 grams of methyl bromide in 500 cm.$^3$ of acetone for 4 hours in a glass autoclave to 50–70° C. The resulting quaternary salt separates quantitatively in crystalline form and is recrystallized from alcohol-acetic ester. Melting point: 193° C.

(b) *Pyridyl-3-methyl-carbazole-ethobromide.* — 50 grams of pyridyl-3-methyl carbazole are heated in an autoclave with 25 grams of ethyl bromide in 500 cm.$^3$ of acetone for 8 hours. The ethobromide separates in crystalline form and is recrystallized from alcohol-acetic ester. The yield amounts to 95% of the theory and the melting point is 232° C.

(c) *Pyridyl-3-methyl-carbazole-n-propobromide.* — 10 grams of pyridyl-3-methyl carbazole are heated with 5 grams of n-propylbromide in 50 cm.$^3$ of propylene carbonate for 12 hours to 100–120° C. in a bomb tube. The quaternary salt which precipitates in a yield of 72%, is recrystallized from alcohol-acetic ester and melts at 193–194° C.

HYDROGENATION (a) *1-methylpiperidyl-3-methyl carbazole.*—100 grams of pyridyl-3-methylcarbazole methobromide are dissolved in 900 cm.$^3$ diluted methanol and subjected to hydrogenation in an autoclave with Raney cobalt catalyst at 70–75° C. After the calculated amount of hydrogen is taken up, the catalyst is separated by filtration, the methanol is distilled off and the residue is rendered alkaline with ammonia. The separated base is taken up in ether, dried with potassium carbonate and treated with active carbon. By the introduction of hydrochloric acid gas the 1-methyl-piperidyl-3-methyl carbazole-hydrochloride is obtained in quantitative yield. After recrystallization from alcohol-acetic ester, this compound melts at 250–251° C.

(b) *1-ethylpiperidyl-3-methyl-carbazole.*—100 grams of pyridyl-3-methylcarbazole-ethobromide are dissolved in 900 cm.$^3$ of diluted methanol and subjected to hydrogenation in an autoclave with Raney nickel catalyst at 70–80° C. After the taking up of hydrogen is completed, the reaction mixture is filtered in hot condition. The N-ethylpiperidyl-3-methyl-carbazole hydrobromide crystallizes upon cooling and is recrystallized from methanol. The yield amounts to 98% of the theory. Melting point: 238° C.

The corresponding hydrochloride prepared from the hydrobromide over the oily base melts—after recrystallization from alcohol-acetic ester—at 218° C.

(c) *1-n-propylpiperidyl-3-methyl-carbazole.*—50 grams of pyridyl-3-methylcarbazole-n-propobromide are dissolved in 400 cm.$^3$ of diluted methanol and subjected to hydrogenation with Raney cobalt in an autoclave at 70–80° C. After the taking up of hydrogen is completed, the reaction mixture is filtered in hot condition, subsequently washed with methanol, the methanol is distilled off and the residue is rendered alkaline with alkali. The base thus separated is taken up in ether, dried with potassium carbonate and purified with active carbon. From the ether solution the base is precipitated in the form of hydrobromide by the introduction of hydrogen chloride. The product, recrystallized from alcohol-acetic ester, melts at 227–228° C. The yield amounts to 95% of the theory.

EXAMPLE 2

N-alkylpiperidyl-4-methyl-carbazole

ALKYLATION

*Pyridyl-4-methyl-carbazole.*—In a 2-liter three-necked flask provided with stirrer, reflux condenser, and a feeding device, 102 grams of carbazole, 85 grams of sodium oxide, and 900 cm.$^3$ of xylene are introduced. To the mixture, which is heated to boiling, 100 grams of finely pulverized pyridyl-4-methyl chloride hydrochloride are gradually added in very small portions during 1–2 hours. After the addition is completed, boiling is continued for 1 hour, and the mixture is then cooled and decomposed with water. The xylene solution is washed with water and extracted by shaking with dilute hydrochloric acid. The acid aqueous solution is treated with active carbon and is rendered alkaline with a solution of alkali, or carbonates, or ammonia. The separated oil is taken up in ether, dried with potassium carbonate and treated again with active carbon, if necessary. After distilling off the ether, the desired compound is obtained as a crystalline residue, which is recrystallized from isopropanol. It melts at 124° C. and the yield amounts to 72% of the theory.

QUATERNARIZATION (a) *Pyridyl-4-methylcarbazole-methobromide.* — 100 grams of pyridyl-4-methyl-carbazole and 50 grams of methylbromide are heated in 500 cm.$^3$ of acetone for 8 hours in a glass autoclave to 80–90° C. The crystallized quaternary salt is separated by filtration and recrystallized from alcohol. The yield amounts to 92% of the theory. Melting point: 236–237° C.

(b) *Pyridyl-4-methyl-carbazole ethobromide.*—50 grams of pyridyl-4-methyl carbazole and 25 grams of ethyl bromide are heated in 300 cm.$^3$ of propylene carbonate in a glass autoclave to 100° C. for 16 hours. The resulting quaternary compound separates as an oily substance and can be brought to crystallization by trituration with 2-pentanone. The yield amounts to 85% of the theory and the melting point of the substance is 149° C.

HYDROGENATION (a) *1-methylpiperidyl-4-methylcarbazole.*—80 grams of pyridyl-4-methylcarbazole-methobromide are dissolved in 500 cm.$^3$ of diluted methanol and subjected to hydrogenation in the presence of Raney nickel. After the taking up of hydrogen is completed, the hydrogenation solution is filtered and concentrated by evaporation, rendered alkaline with a solution of alkali, and the separated oil is taken up in ether. After drying the ether solution with potassium carbonate, the base is precipitated in form of the hydrochloride by introduction of hydrogen chloride. By recrystallization from alcohol-ether, 85 grams of N-methylpiperidyl-4-methylcarbazole hydrochloride having a melting point of 79° C. are obtained.

(b) *1-ethylpiperidyl-4-methyl-carbazole.*—50 grams of pyridyl-4-methylcarbazole ethobromide are dissolved in 500 cm.$^3$ of diluted methanol and subjected to hydrogenation in the presence of palladium on carbon in an autoclave at 25–40° C. The hydrogenating solution is freed from methanol, is rendered alkaline with ammonia and the separated oil is taken up in ether. After drying the ether solution with potassium carbonate, the base is separated in form of the hydrochloride by means of hydrogen chloride. The base is recrystallized from alcohol-acetic ester. The yield amounts to 89% of the theory and the melting point is 167–168° C.

EXAMPLE 3

1-alkylpiperidyl-2-methyl-carbazole

ALKYLATION

*Pyridyl-2-methyl-carbazole.*—Into a 2-liter three-necked flask provided with stirrer, reflux condenser and dropping funnel 102 grams of carbazole, 35 grams of sodium amide and 500 cm.$^3$ toluene are introduced. The mixture is heated to boiling under stirring and under reflux for two hours, whereupon 78 grams of pyridyl-2-methylcarbazole in 500 cm.$^3$ of toluene are dropwise gradually introduced during one hour. This last mentioned compound has to be freshly prepared by decomposition and saturation of a concentrated aqueous solution of 103 grams of pyridyl-2-methyl-chloride hydrochloride, with potassium carbonate. After the addition is completed, boiling of the reaction mixture is continued for 30 minutes, whereupon said mixture is cooled and decomposed with little alcohol and subsequently with water. The toluene solution is washed with water and extracted by shaking with hydrochloric acid. The hydrochloric acid solution is purified with active carbon and is rendered alkaline with ammonia. The base which separates in oily condition, crystallizes subsequently. It is filtered off, washed with water, and recrystallized from isopropanol. 136 grams of pyridyl-2-methylcarbazole (87% of the theory) are thus obtained with a melting point of 121° C.

QUATERNARIZATION

*Pyridyl-2-methyl-carbazole-methobromide.*—100 grams of pyridyl-2-methylcarbazole and 42 grams of methylbromide are heated in 500 cm.$^3$ of acetone in an autoclave to 70–90° C. for 8 hours. The quaternary salt which is quantitatively separated in crystalline condition, is filtered off and is recrystallized from alcohol-acetic ester. The melting point is 226–228° C.

HYDROGENATION

*1-methylpiperidyl-2-methyl-carbazole.*—200 grams of pyridyl-2-methyl-carbazole-methobromide are dissolved in one liter of diluted methanol and subjected to hydrogenation in the presence of Raney nickel or Raney cobalt at 70–80° C. After taking up of the calculated amount of hydrogen is completed, the solution is filtered and concentrated by evaporation. The syrup-like residue is diluted with water and is rendered alkaline with alkali or ammonia. The separated base is taken up in chloroform, dried with potassium carbonate and purified with active carbon. The crystalline residue obtained by distilling off the chloroform is recrystallized from isopropanol. 1-methylpiperidyl-2-methyl-carbazole is thus obtained in almost quantitative yield with a melting point of 107° C.

The base yields with inorganic or organic acids, salts, for example, the hydrochloride (from diluted isopropanol) with a melting point of 237–239° C.; the amidosulfonate (from diluted isopropanol) with a melting point of 117–119° C.; and the lactate (from acetic ester) with a melting point of 113° C.

EXAMPLE 4

1-alkyl-6-methylpiperidyl-2-methyl-carbazole

ALKYLATION

*6-methylpyridyl-2-methyl-carbazole.*—Into a 2-liter three-necked flask provided with stirrer, reflux condenser and dropping funnel, 94 grams of carbazole, 7 grams of lithium hydride and 500 cm.$^3$ of benzene are introduced. The mixture is heated to boiling under stirring and under reflux for 2–3 hours, whereupon 79 grams of 6-methylpyridyl-2-methylchloride in 400 cm.$^3$ of benzene are gradually dropwise introduced during one hour. Boiling is then continued for about one hour, whereupon the mixture is cooled and cautiously decomposed with water. The benzene solution of the base is thoroughly washed with water and extracted by shaking with dilute hydrochloric acid. The difficultly soluble hydrochloride of 6-methylpyridyl-2-methyl-carbazole separates in crystalline form, is filtered off and recrystallized from dilute hydrochloric acid. The melting point is 219–220° C. The crude or pure salt is decomposed with ammonia, the base is taken up in ether, dried with potassium carbonate and purified with active carbon. The residue obtained by distilling off the ether is recrystallized from acetic ester. The yield of the base amounts to 75% of the theory and the melting point of the base is 118° C.

QUATERNARIZATION

*6-methylpyridyl-2-methyl-carbazole - methobromide.*—100 grams of 6-methylpyridyl-2-methyl-carbazole are subjected to quaternarization with 50 grams of methyl bromide in 600 cm.$^3$ of acetone by heating is an autoclave to 90–95° C. for two days. The separated salt is recrystallized from alcohol-acetic ester. The yield amounts to 71% of the theory and the melting point is 238–239° C.

HYDROGENATION

*1,6-dimethylpiperidyl-2-methyl-carbazole.*—120 grams of 6-methylpyridyl-2-methyl-carbazole methobromide are dissolved in 900 cm.$^3$ of diluted methanol and subjected to hydrogenation in an autoclave in the presence of Raney cobalt at 50–65° C. The hydrogenating solution is concentrated by evaporation, the resulting hydrobromide of the base to be prepared is decomposed with ammonia and the separated oil is taken up in ether. After drying and purifying in conventional manner the solution of the base, the 1,6-dimethylpiperidyl-2-methyl-carbazole is precipitated in the form of the hydrochloride and is recrystallized from isopropanol-ether. The yield amounts to 91% of the theory and the melting point is 194–195° C.

EXAMPLE 5

1-alkyl-5-methylpiperidyl-2-methyl-carbazole

ALKYLATION

*5 - methylpyridyl-2 - methyl-carbazole.*—Into a 2-liter three-necked flask provided with stirrer, reflux condenser and dropping funnel, 94 grams of carbazole, 90 grams of sodium oxide and 800 cm.$^3$ of xylene are introduced. The mixture is heated to boiling, whereupon 100 grams of finely pulverized 5-methylpyridyl-2-methylchloride-hydrochloride are added gradually in very small portions during two hours. Boiling is then continued for one hour. The reaction mixture is now decomposed with water and is abundantly washed with water in order to remove quaternarized ingredients. Upon treatment of the basic xylene solution with hydrochloric acid the hydrochloride of 5-methylpyridyl-2-methyl-carbazole separates in crystalline form. It is filtered off, decomposed with soda, the separated base is taken up in ether and dried with potassium carbonate. The crystalline residue of the ether solution is recrystallized from acetic ester. The yield amounts to 88% of the theory and the 5-methylpyridyl-2-methyl-carbazole melts at 81–82° C.

QUATERNARIZATION

*5-methylpyridyl-2-methyl-carbazole - methobromide.*—100 grams of 5-methylpyridyl-2-methyl-carbazole are quaternarized by heating in an autoclave with 50 grams of methyl bromide in 400 cm.$^3$ of alcohol for 8 hours. After concentration by evaporation of the alcoholic solution the methobromide separates in crystalline form upon cooling. It is recrystallized from alcohol. The yield amounts to 85% of the theory and the melting point is 258–260° C.

HYDROGENATION

*1,5-dimethylpiperidyl-2-methyl-carbazole.*—130 grams of 5-methylpyridyl-2-methyl-carbazole-methobromide are dissolved in one liter of methanol and subjected to hydrogenation in the presence of a platinum catalyst in an autoclave at room temperature, e.g. 15–25° C., until the calculated amount of hydrogen is taken up by hydrogenation. The solution is filtered in hot condition, the filtered solution is concentrated by evaporation and yields upon cooling in quantitative yield the 1,5-dimethylpiperidyl-2-methyl-carbazole-hydrobromide. Upon recrystallization from water this compound melts at 263–264° C. The base can be obtained from the salt in conventional manner and melts after recrystallization from benzine at 106–107° C.

EXAMPLE 6

(1'-alkylpiperidyl-2'-methyl)-3-methylcarbazole

ALKYLATION

*(Pyridyl-2'-methyl-)-3-methylcarbazole.*—Into a 2-liter flask provided with stirrer, reflux condenser and dropping funnel 45 grams of 3-methylcarbazole, 13 grams of sodium amide and 400 cm.$^3$ of xylene are introduced. The mixture is heated to boiling under stirring and under reflux for two hours whereupon 38 grams of pyridyl-2-methylchloride in 300 cm.$^3$ of xylene are gradually dropwise added during 30 minutes. The last mentioned compound should be freshly prepared by setting it free from 50 grams of pyridyl-2-methylchloride-hydrochloride. Subsequently, boiling is continued for an additional hour whereupon the reaction product is cooled and decomposed with little alcohol and subsequently with water. The xylene solution is thoroughly washed with water in order to remove quaternarized products. It is then extracted by shaking with dilute hydrochloric acid and the acid aqueous solution is purified with active carbon. The base to be prepared can be separated in oily condition, by rendering the solution alkaline with ammonia, an alkali hydroxide or alkali metal carbonate. The base is taken up in ether, dried with potassium carbonate and purified with active carbon. By distilling off the ether a crystalline residue is obtained which is recrystallized from acetic ester. 53 grams of (pyridyl-2'-methyl-)-3-methylcarbazole are thus obtained with a melting point of 103–104° C.

QUATERNARIZATION

*(Pyridyl-2'-methyl-)-3-methylcarbazole-methobromide.*—40 grams of (pyridyl-2'-methyl)-3-methylcarbazole are quaternarized by heating in a glass autoclave with 20 grams of methylbromide in 300 cm.$^3$ of acetone to 100° C. for 8 hours. The salt, which separates in crystalline form, is recrystallized from alcohol-acetic ester. The yield amounts to 77% of the theory and the melting point is 220–221° C.

HYDROGENATION

*(1' - methylpiperidyl - 2' - methyl - ) - 3 - methylcarbazole.*—30 grams of (pyridyl-2'-methyl-)-3-methylcarbazole-methobromide are dissolved in 250 cm.$^3$ of diluted methanol and subjected to hydrogenation in the presence of Raney nickel at 70–80° C. until the taking up of hydrogen is completed. The hydrogenating solution is filtered in hot condition and completely evaporated. The residue is taken up in water, rendered alkaline with an alkali and the separated base is taken up in ether or benzene. The crystalline residue obtained by distilling off the solvent is recrystallized from benzine or acetic ester. The yield amounts to 91% of the theory and the melting point is 112–113° C.

EXAMPLE 7

(1'-alkylpiperidyl-2'-methyl-)-3-methoxy-carbazole

ALKYLATION (Pyridyl-2'-methyl-)-3-methoxycarbazole.—Into a 2-liter flask provided with stirrer, reflux condenser and dropping funnel 51 grams of 3-methoxy-carbazole, 15 grams of sodium amide and 400 cm.³ of xylene, are introduced. After boiling for 2 hours 38 grams of pyridyl-2-methylchloride in 500 cm.³ of xylene are gradually dropwise added. After continued boiling for one hour, the reaction mixture is cooled and decomposed with alcohol and subsequently with water. The xylene solution is abundantly washed with water and the base to be prepared is subsequently extracted therefrom by shaking with a dilute strong acid. After purification of the salt solution with active carbon, the base is freed, taken up in ether, dried with potassium carbonate and the ether is distilled off. The crystalline residue is recrystallized from isopropanol. 61 grams of pyridyl-2'-methyl-3-methoxycarbazole are thus obtained with a melting point of 117° C.

QUATERNARIZATION (Pyridyl-2'-methyl-)-3-methoxycarbazole methobromide.—50 grams of (pyridyl-2'-methyl-)-3-methoxy-carbazole, 25 grams of methylbromide and 200 cm.³ of acetic ester are heated in a glass autoclave to 100° C. for 8 hours. The crystallized methobromide is recrystallized from alcohol-acetic ester or isopropanol. The yield amounts to 96% of the theory and the melting point is 199–200° C.

HYDROGENATION (1'-methylpiperidyl-2'-methyl-)-3-methoxycarbazole.—60 grams of (pyridyl-2'-methyl-)-3-methoxycarbazole methobromide are dissolved in 500 cm.³ of methanol of 50% and subjected to hydrogenation in an autoclave in the presence of Raney cobalt at 75° C. until the taking up of hydrogen is completed. The solution is filtered in hot condition and subsequently concentrated by evaporation, diluted with water and rendered alkaline with an alkali. The separated oil is taken up in ether, dried with potassium carbonate and purified with active carbon. The ether is distilled off and the residue is treated with hot benzine. The resulting crystals are recrystallized from acetic ester-benzine. The yield amounts to 88% of the theory and the melting point is 90–91° C.

EXAMPLE 8

(1'-alkylpiperidyl-2'-methyl-)-2-chlorocarbazole

ALKYLATION (Pyridyl-2'-methyl-)-2-chlorocarbazole.—Into a 2-liter flask provided with stirrer, reflux condenser and dropping funnel, 51 grams of 2-chlorocarbazole, 12 grams of sodium amide and 500 cm.³ of benzene are introduced and the mixture is heated to boiling under stirring and under reflux for 3 hours. Subsequently, a freshly prepared, well cooled solution of 38 grams of pyridyl-2-methylchloride in 400 cm.³ of benzene are gradually added dropwise during one hour and boiling is then continued for one additional hour. The reaction solution is cooled, decomposed with alcohol and water and repeatedly washed with water. Upon treatment of the benzene solution with dilute hydrochloric acid, (pyridyl-2'-methyl)-2-chlorocarbazole-hydrochloride separates in crystalline form. It is recrystallized from dilute hydrochloric acid with the addition of active carbon. The yield amounts to 81% of the theory and the melting point is 209° C. By decomposing the hydrochloride with ammonia, the base is obtained, which—after recrystallization from acetic ester-benzine—melts at 104–105° C.

QUATERNARIZATION (Pyridyl-2'-methyl-)-2-chlorocarbazole-methobromide.—50 grams of (pyridyl-2'-methyl-)-2-chlorocarbazole and 30 grams of methyl bromide in 300 cm.³ acetone are quaternarized in an autoclave by heating to 80–90° C. during 8 hours. The separated salt is filtered off and recrystallized from alcohol-acetic ester. The yield amounts to 94% of the theory and the melting point is 225° C.

HYDROGENATION (1'-methylpiperidyl-2'-methyl-)-2-chlorocarbazole.—50 grams of (pyridyl-2'-methyl-)-chlorocarbazole-methobromide are dissolved in 300 cm.³ of methanol of 50% and subjected to hydrogenation with Raney cobalt in an autoclave at 50–55° C. The hydrogenation solution is filtered in hot condition, the catalyst is washed with hot methanol and the methanol is distilled off. The residue is dissolved in water and rendered alkaline with sodium hydroxide solution. The separated base is taken up in ether, dried with potassium carbonate and purified with active carbon. After distilling off the solvent, the desired compounds is obtained as a crystalline mass which is recrystallized from acetic ester-benzine or dibutylether. The yield amounts to 87% of the theory and the melting point is 124–126° C.

EXAMPLE 9

2-(1'-alkylpiperidyl-2'-)-ethyl-carbazole
2-(pyridyl-2'-)-ethylcarbazole

ALKYLATION

Into a 2-liter flask provided with stirrer, reflux condenser, feed device and thermometer, 63 grams of carbazole, 55 grams of sodium oxide and 700 cm.³ of tetralin are introduced. The mixture is heated under stirring to 140° C., whereupon 100 grams of finely pulverized 2-(pyridyl-2'-)-ethylbromide-hydrobromide are added gradually in very small portions during one hour. Subsequently, heating is continued to 150° C. for two additional hours. After cooling the product is decomposed with water, the Tetralin solution is abundantly washed with water and extracted by shaking with dilute hydrochloric acid. The 2-(pyridyl-2-)-ethylcarbazole-hydrochloride crystallizes from the aqueous solution of hydrochloric acid and is recrystallized from dilute hydrochloric acid. Needles having a melting point of 224–225° C. are thus obtained. The yield amounts to 65% of the theory. From the hydrochloride, the base can be obtained in conventional manner. After recrystallization from acetic ester-benzine, this base melts at 77° C.

QUATERNARIZATION (a) 2-(pyridyl-2'-)-ethylcarbazole-methobromide.—50 grams of 2-pyridyl-2'-ethyl-carbazole and 22 grams of methylbromide are heated in 300 cm.³ of alcohol in a glass autoclave to 100° C. for 6 hours. Upon concentrating the alcohol solution by evaporation, the methobromide crystallizes from the alcoholic solution. The yield amounts to 96% of the theory and the melting point is 222–223° C.

(b) 2-(pyridyl-2'-)-ethyl-carbazole-ethobromide.—50 grams of 2-(pyridyl-2'-)-ethyl-carbazole and 25 grams of ethylbromide are quaternarized in 300 cm.³ of acetone by heating to 100° C. for 12 hours. A crystalline salt separates and is recrystallized from alcohol. The yield amounts to 82% of the theory and the melting point is 182–183° C.

HYDROGENATION (a) 2-(1'-methylpiperidyl-2'-)-ethylcarbazole.—60 grams of 2-(pyridyl-2'-)-methyl carbazole-methobromide are dissolved in 500 cm.³ of diluted methanol and subjected to hydrogenation in the presence of Raney nickel at 50°–70° C. in an autoclave until the taking up of hydrogen is completed. The filtered solution is freed from methanol, the residue is diluted with water and rendered alkaline by the addition of an alkali. The separated base is taken up in ether, dried and purified with active carbon. After distilling off the ether, the residue is recrystallized from acetic ester. 59 grams of 2-(1'-methylpiperidyl-2'-)-ethylcarbazole having a melting point of 123–124° C. are thus obtained.

(b) *2 - (1' - ethylpiperidyl - 2') - ethylcarbazole.*—45 grams of 2-(pyridyl-2'-)ethyl-carbazole-ethobromide are dissolved in 400 cm.³ of diluted methanol and subjected to hydrogenation in the presence of palladium-carbon at room temperature, e.g. 18–25° C. The filtered hydrogenation solution is concentrated by evaporation and then brought to crystallization. The resulting 2-(1'-ethylpiperidyl-2'-)-ethylcarbazole hydrobromide is recrystallized from alcohol and has then a melting point of 149–151° C. The yield amounts to 66% of the theory.

EXAMPLE 10

2-(1'-alkylpiperidyl-4'-)ethylcarbazole

ALKYLATION

*2-(pyridyl-4') ethylcarbazole.*—Into a 2-liter flask provided with stirrer, reflux condenser and dropping funnel, 60 grams of carbazole, 100 grams of finely pulverized, dried potassium carbonate and 500 cm.³ of xylene are introduced. The mixture is heated under stirring to boiling and a freshly prepared solution of 50 grams of 2-(pyridyl-4') ethyl chloride are gradually dropwise added within one hour. Boiling is then continued for 2 additional hours and the product is then decomposed with water. The xylene solution is thoroughly washed with water and is then extracted by shaking with dilute hydrochloric acid. The 2-(pyridyl-4'-) ethylcarbazole hydrochloride crystallizes from the acid solution and is recrystallized from alcohol containing hydrogen chloride. The yield amounts to 62% of the theory and the melting point is 233–234° C.

The base set free from the hydrochloride is recrystallized from acetic ester and melts then at 171–173° C.

QUATERNARIZATION

*2 - (pyridyl - 4' - ) ethylcarbazole - methobromide.*—30 grams of 2-(pyridyl-4'-) ethylcarbazole and 20 grams of methylbromide are heated in a glass autoclave in 300 cm.³ of acetone to 60° C. for 3 hours. The quantitatively separating crystalline methobromide is filtered off and recrystallized from alcohol-acetic ester. The melting point is 202–203° C.

HYDROGENATION

*2-(1'-methylpiperidyl-4'-) ethyl carbazole.*—35 grams of 2-(pyridyl-4'-) ethylcarbazole-methobromide are dissolved in 300 cm.³ of methanol of 50% and subjected to hydrogenation with Raney cobalt at 50–60° C. in an autoclave. The hydrogenation solution is then separated from the catalyst and mixed with alcohol. The hydrobromide of the 2-(1'-methylpiperidyl-4-) ethylcarbazole crystallizes in a yield of 92% of the theory and—after recrystallization from alcohol—has a melting point of 235–236° C.

EXAMPLE 11

1-alkylpiperidyl-4-carbazole

ALKYLATION

*Pyridyl-4-carbazole.*—Into a 2-liter flask provided with stirrer, reflux condenser, dropping funnel and thermometer 56 grams of carbazole, 18 grams of sodium amide and 800 cm.³ of tetralin are introduced. The mixture is heated under efficient stirring to 160–170° C. for 2 hours and at the same temperature 38 grams of freshly distilled 4-chloro-pyridine are then dropwise gradually added within 90 minutes. Boiling is continued for 2 additional hours and the product is then decomposed with alcohol and water, the tetralin solution is abundantly washed with water and then extracted by shaking with hydrochloric acid. The acid solution is treated with active carbon and rendered alkaline with ammonia. The separated oil is taken up in ether, purified again with active carbon and dried with potassium carbonate. After distilling off the ether, an oily residue is obtained, which can be crystallized from benzine. After recrystallization from benzine, the desired base is obtained in a yield of 46% and a melting point of 135° C.

QUATERNARIZATION

*Pyridyl-4-carbazole-methobromide.*—30 grams of pyridyl-4-carbazole are heated with 16 grams of methyl bromide in 200 cm.³ of acetone in an autoclave to 60–70° C. The quaternary salt, which separates in crystalline form, is filtered off and recrystallized from alcohol. The yield amounts to 92% of the theory and the melting point is 246–247° C.

HYDROGENATION

*1-methylpiperidyl-4-carbazole.*—33 grams of pyridyl-4-carbazole-methobromide are dissolved in 400 cm.³ of diluted methanol and subjected to hydrogenation in the presence of Raney nickel at 50–60° C. in an autoclave, until the calculated amount of hydrogen is taken up. The filtered solution is freed from methanol and rendered alkaline by the addition of sodium hydroxide solution. The separated oil is taken up in ether, dried with potassium carbonate, and purified with active carbon. After distilling off the ether, the residue is dissolved in hot benzine. The 1-methyl-piperidyl-4-carbazole crystallized from benzine melts at 151–152° C. The yield amounts to 91% of the theory.

The novel products of the present invention are distinguished by valuable therapeutic effects and can be used as such, or as intermediates in the preparation of substances for therapeutic treatments, as examples of which the following are mentioned: Use for raising the effect of analgesic substances, such as for example morphine, without affecting the blood pressure and the vegetative system; increase of normal blood pressure and increase of blood pressure lowered by the action of sympathicolytic substances, such as for example, chloropromazine. The dosage to be used corresponds in general to that conventionally used in the administration of the related phenthiazine derivatives and administration can take place for example per os by intramuscular injection.

Reference is made to my co-pending application Ser. No. 636,879, filed January 29, 1957 for "Substituted Carbazole Derivatives."

The term "diluted methanol" is used in the present application to denote aqueous methanol containing water in the range of 5 to 36% by volume, and the term "diluted isopropanol" is used to denote aqueous isopropanol containing water in the range of 5 to 10% by volume. The term "tetralin" is used to denoted tetrahydronaphthalene.

What is claimed is:

1. A process for the preparation of carbazole derivatives containing basic substituents and corresponding to the general formula

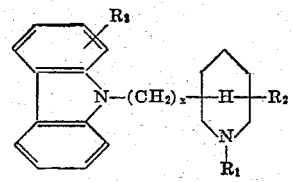

wherein the carbazole is attached in one of the positions 2, 3 and 4 of the piperidine radical, whereby the value of $x$ is selected from 1 and 2 in the 2-position and from 0, 1 and 2 in the 3- and 4 positions; $R_1$ is a lower alkyl; $R_2$ is selected from the group consisting of H and lower alkayl; $R_3$ is selected from the group consisting of H, lower alkyl, oxy and alkoxy groups and halogens; said process comprising the following steps: (*a*) a compound selected from the group consisting of carbazole and C-substituted carbazoles is alkylated with a compound selected from the group consisting of pyridyl halides and pyridyl alkylhalides, in the presence of an alkaline condensing agent, in an inert solvent; (b) the products resulting from step (a) are quaternarized at the pyridine N with a lower alkyl halide; (c) the pyridinium salts resulting from step (b) and corresponding to the general formula

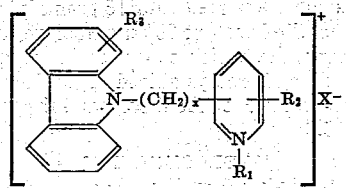

in which $R_1$, $R_2$, $R_3$ and $x$ have the meaning defined above and X stands for the anion, are subjected to hydrogenation in the presence of a metallic hydrogenation catalyst, in order to form a compound selected from the group consisting of N-alkylpiperidylcarbazoles and N-alkylpiperidylalkyl carbazoles.

2. A process as claimed in claim 1, in which $R_1$ stands for the methyl radical.

3. A process as claimed in claim 1, in which the pyridyl halide and pyridyl alkyl halide used in step (a) is selected from the group consisting of the respective chlorides and bromides.

4. A process as claimed in claim 1, in which the carbazole and C-substituted carbazoles are used in the form of the respective bases.

5. A process as claimed in claim 1, in which the carbazole and C-substituted carbazoles are used in the form of the respective salts.

6. A process as claimed in claim 1, in which the hydrogenation catalyst is selected from the group consisting of nickel, cobalt, platinum and palladium.

7. A process as claimed in claim 1, in which the alkaline condensing agent is selected from the group consisting of alkali metals, their hydrides, amides, oxides and carbonates.

8. A process as claimed in claim 1, in which the solvent is selected from the group consisting of aromatic hydrocarbons and higher ethers.

9. A process as claimed in claim 1, in which X stands for a halogen selected from the group consisting of chlorine and bromine.

References Cited in the file of this patent

UNITED STATES PATENTS

| | | |
|---|---|---|
| 2,687,414 | Cusic | Aug. 24, 1954 |
| 2,773,875 | Finkelstein | Dec. 11, 1956 |
| 2,784,185 | Schuler | Mar. 5, 1957 |

OTHER REFERENCES

Shapiro et al.: J. Am. Pharm. Assoc., vol. 46 (June 1957), pages 333–6.

Maier-Bode: Pyridin und seine Derivate (1934), p. 103.